10

United States Patent Office 3,555,053
Patented Jan. 12, 1971

---

3,555,053
13β-ALKYL-9β,10α-PREGNANES
Rudolf van Moorselaar, van Houtenlaan, Weesp, Netherlands, assignor to U.S. Philips Corporation, New York, N.Y., a corporation of Delaware
No Drawing. Filed July 9, 1968, Ser. No. 743,311
Claims priority, application Great Britain, July 11, 1967, 31,785/67; June 5, 1968, 26,719/68
Int. Cl. C07c 169/30
U.S. Cl. 260—397.3   6 Claims

ABSTRACT OF THE DISCLOSURE 18-ethyl or 18-propyl 9β,10α steroids for example 18-methyl 9β,10α-pregn-4-ene-3,20-dione and 6-chloro-18-methyl-9β,10α pregna-1,4,6-triene-3,20-dione are shown. These compounds are useful as progestational agents.

---

The invention relates to 9β,10α-steroids of the general formula

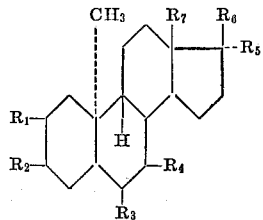

(I)

in which formula:

$R_1$ represents a hydrogen atom or a 1,2-methylene group,
$R_2$ represents a 3-keto-4-dehydro-
    3-keto-1,4-bisdehydro-
    3-keto-4,6-bisdehydro-
    3-keto-1,4,6-trisdehydro-
    3-OR-4-dehydro-
    3-OR-4,6-bisdehydro-
    3-OR'-3,5-bisdehydroor a 3-OR'-2,4,6-trisdehydro system wherein:
R is a hydrogen atom, an alkyl- or an acyl group,
R' is an alkyl- or acyl group, $R_3$ represents a hydrogen atom, a halogen atom or a lower alkyl group,
$R_4$ represents a hydrogen atom or a 6,7-methylene group,
$R_5$ represents a hydrogen atom, a hydroxy-, alkoxy- or acyloxy group,
$R_6$ represents an acetyl group, a hydroxylated acetyl group, an etherified or esterified hydroxylated acetyl group, a —CH(OH)—CH$_3$ group or an etherified or esterified —CH(OH)—CH$_3$ group, and
$R_7$ represents an alkyl- or alkenyl group, ecah group containing from 2-3 inclusive carbon atoms.

The compounds of the invention have interesting farmacological activities. In particular, the compounds of the invention have a progestational activity. This applies especially to these compounds of the formula I wherein $R_7$ represents an ethyl group, which exhibit a strong progestational activity.

Particularly it was found that compounds of the general formula

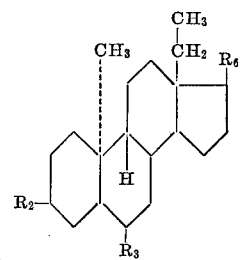

(III)

in which formula:
$R_2$ represents a 3-keto-4-dehydro-, 3-keto-1,4-bisdehydro-, 3-keto-4,6-bisdehydro- or a 3-keto-1,4,6-trisdehydro system,
$R_3$ represents a hydrogen atom, a halogen atom or a lower alkyl group, and
$R_6$ represents an acetyl group or the group

—CH(OH)—CH$_3$, and compunods of the general formula

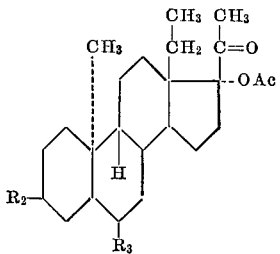

(IV)

in which formula:
$R_2$ represents a 3-keto-4-dehydro-, 3-keto-4,6-bisdehydro-, or a 3-keto-1,4,6-trisdehydro system,
$R_3$ represents a hydrogen atom or a halogen atom, and
OAc represents an acyloxy group, show favourable and useful phармalogical properties.
Excellent properties were found with:
(1) Compounds of the general Formula III hereabove, wherein:

$R_2$ represents a 3-keto-4-dehydro-, 3-keto-4,6-bisdehydro- or a 3-keto-1,4,6-trisdehydro system,
$R_3$ represents a hydrogen atom or a halogen atom,
$R_6$ represents an acetyl group or the group

—CH(OH)—CH$_3$ (2) Compounds of the general Formula III hereabove, wherein:

$R_2$ represents a 3-keto-4-dehydro- or a 3-keto-4,6-bisdehydro system,
$R_3$ represents a methyl group, and
$R_6$ represents an acetyl group.

(3) Compounds of the general Formula IV hereabove, wherein:

$R_2$ represents a 3-keto-4,6-bisdehydro- or a 3-keto-1,4,6-trisdehydro system,
$R_3$ represents a hydrogen atom or a chlorine atom, and
OAc stands for an acetoxy group or an acyloxy group known to induce an elongated activity.

Examples of acyloxy groups which are able to induce an elongated activity to the steroids of the Formula IV, represented above, are: acyloxy groups derived from aliphatic monocarboxylic acids containing from 4-12 carbon atoms and 3-(p-butoxyphenyl)-propionoxy. In particular reference is made to the following list of inventive compounds which proved to have very useful properties:

18-methyl-9β,10α-pregna-4,6-diene-3,20-dione,
18-methyl-9β,10α-pregn-4-ene-3,20-dione,
18-methyl-20-hydroxy-9β,10α-pregna-4,6-dien-3-one,
17α-hydroxy-18-methyl-9β,10α-pregna-4,6-diene-3,20-dione 17-acetate,
18-methyl-9β,10α-pregna-1,4-6-triene-3,20-dione,
6-chloro-17α-hydroxy-18-methyl-9β,10α-pregna-4,6-diene-3,20-dione 17-acetate,
3-hydroxy-18-methyl-9β,10α-pregna-3,5-dien-20-one 3-acetate,
6-chloro-17α-hydroxy-18-methyl-9β,10α-pregna-1,4,6-triene-3,20-dione 17-acetate,
6-chloro-18methyl-9β,10α-pregna-4,6-diene-3,20-dione,
6-chloro-18-methyl-9β,10α-pregna-1,4,6-triene-3,20-dione,
6β-chloro-18-methyl-9β,10α-pregna-1,4-diene-3,20-dione,
6β-chloro-18-methyl-9β,10α-pregn-4-ene-3,20-dione,
6-fluoro-18-methyl-9β,10α-pregna-4,6-diene-3,20-dione,
6-bromo-18-methyl-9β,10α-pregna-4,6-diene-3,20-dione,
6-chloro-17α-methoxy-18-methyl-9β,10α-pregna-4,6-diene-3,20-dione,
6α-methyl-18-methyl-9β,10α-pregna-4-ene-3,20-dione,
6-methyl-18-methyl-9β,10α-pregna-4,6-diene-3,20-dione,
6,7-methylene-18-methyl-9β,10α-pregn-4-ene-3,20-dione,
6α-chloro-6,7-methylene-18-methyl-98β,10α-pregn-4-ene-3,20-dione,
6,7-methylene-18-methyl-9β,10α-pregna-1,4-diene-3,20-dione,
17α-hydroxy-18-methyl-9β,10α-pregn-4-ene-3,20-dione 17-acetate,
3,17-dihydroxy-18-methyl-9β,10α-pregna-3,5-dien-20-one 3,17-diacetate,
18-ethyl-9β,10α-pregna-4,6-diene-3,20-dione,
18-ethyl-9β,10α-pregn-4ene-3,20-dione,
18-vinyl-9β,10α-pregn-4-ene-3,20-dione,
18-vinyl-9β,10α-pregna-4,6-diene-3,20-dione.

Due to their properties, the compounds of the invention can be used as progestational agents. In this respect it should be observed that the compounds according to the invention may be employed in the same manner and for the same purposes as the well-known progestational agents Thus the invention compounds may find application e.g. in the treatment of climacterial disorders, of primary and secondary amenol rhoe as an contraceptive agent and for maintenance of pregnancy.

The invention further relates to compounds of the general formula

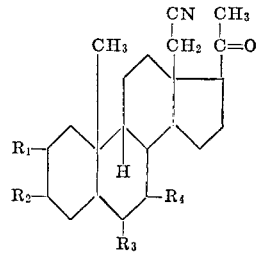

in which formula:
R₁ represents a hydrogen atom, or a 1,2-methylene group,
R₂ represents a 3-keto-4-dehydro-, 3-keto-1,4-bisdehydro-, 3-keto-4,6-disdehydro-, or a 3-keto-1,4,6-trisdehydro system,
R₃ represents a hydrogen atom, a halogen atom or a lower alkyl group, and
R₄ represents a hydrogen atom or a 6,7-methylene group.

These compounds are very interesting intermediate products in the preparation of the compounds of the general Formula I, represented herein before, which latter compounds show the useful pharmacological properties mentioned herebefore.

Examples of intermediate compounds according to the invention, are:

18-cyano-9β,10α-pregn-4-ene-3,20-dione,
18-cyano-9β,10α-pregna-4,6-dien-3,20-dione,
18-cyano-9β,10α-pregna-1,4,6-trien-3,20-dione,
6-fluoro-18-cyano-9β,10α-pregna-4,6-diene-3,20-dione.

The novel steroids of the invention are indicated as 9β, 10α-steroids to indicate at which carbon atoms (9 and 10) the stereoconfiguration deviates from the one of the normal steroids and in which sense (9β,10α-in contradiction to the 9α,10β-configuration of the normal steroids).

The stereo-chemical configuration at the carbon atoms 8, 9, 10, 13 and 14 of the inventive compounds is the same as in dihydro-isolumisterone. Castells et al., have shown that dihydro-isolumisterone has the configuration 8β,9β,10α,13β and 14α (Proc. of the Chemical Society, 1958, page 7).

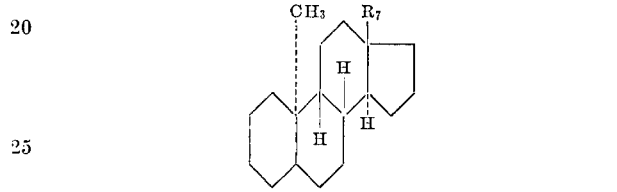

In the above given structural formula the β-position at the carbon atoms 8, 9, and 13 is indicated by a solid line, whereas the α-position at the carbon atoms 10 and 14 is indicated by a broken line. It should be observed that the configuration of the hydrogen atoms or substituents at the other carbon atoms may be either α,β or planar. Whether a hydrogen atom or a substituent at these other carbon atoms is in one of these positions in indicated by the chemical name only and not by the chemical formulae unless explicitly so expressed as in the case of a dotted line which always indicates the α-configuration.

When R₃ represent a lower alkyl group, said group contains from 1–6 inclusive carbon atoms, for instance a methyl-, ethyl-, or propyl group.

When R₂ represents a system containing an alkoxy group, the alkoxy group is preferably an aliphatic or mixed aliphatic-aromatic or mixed aliphatic-alicyclic group. As such may be mentioned methoxy-, ethoxy-, propoxy-, tert.-butoxy-, cyclopentyloxy-, cyclohexyloxy-, and benzyloxy. When R₂ represents an acyloxy group, said group is preferably the acyloxy group of an aliphatic mono-carboxylic acid containing from 1–20 carbon atoms, and especially from 1–6 carbon atoms. Examples of such carboxylic acids are: formic acid, acetic acid, butyric acid and valeric acid.

When R₅ represents an acyloxy group, said group preferably an aliphtaic mixed aliphatic -aromatic or mixed aliphatic-alicyclic group.

The same examples as in the last but one paragraph may be mentioned, further cyclopent-1′-enyloxy-, 1′-ethoxy-cyclopentyloxy- and tetrahydro-pyranyloxy.

When R₅ represents an acyloxy group, said group preferably contains from 1–20 carbon atoms. The acyl part of the acyloxy group is preferably the acryl group of a saturated or unsaturated aliphatic mono-, di- or tricarboxylic acid, a mixed aliphatic-aromatic carboxylic acid, an aromatic carboxylic acid, saturated or unsaturated alicyclic or mixed liphatic-alicyclic monocarboxylic acid, especially those having from 1–6 carbon atoms. Examples of acyloxy groups are: formoxy, acetoxy, propionoxy, butyr oxy, the acyloxy groups of oleic acid, palmitic acid, stearic acid, enanthoic acid, undecyloic acid, caproic acid, pivalic acid, succinic acid, malonic acid, citric acid, benzoic acid, hexahydrobenzoic acid, phenylacetic acid, p-hexyloxyphenylpropionic acid, β-cyclopentylpropionic acid and β-cyclohexylpropionic acid.

When R₆ represents an esterified hydroxylated acetyl group or —CH(OH)—CH₃ group, the ester group is preferably derived from an acid as defined hereinbefore for $R_5$.

The compounds according to the invention may be prepared from 9β,10α-steroids by techniques known per se. In particular the compounds of the invention may be prepared by methods characterized in that:

(a) A compound of the formula

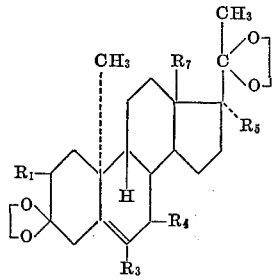

(V)

in which formula:

$R_1$ represents a hydrogen atom or a 1,2-methylene group,
$R_3$ represents a hydrogen atom, a halogen atom or a lower alkyl group,
$R_4$ represents a hydrogen atom or a 6,7-methylene group,
$R_5$ represents a hydrogen atom, a hydroxy-, alkoxy- or acyloxy group and
$R_7$ represents an alkyl- or alkenyl group containing from 2–3 carbon atoms, is deketalized at carbon atoms 3 and 20 to produce a compound of the formula

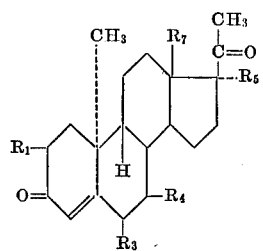

(VI)

in which formula $R_1$, $R_3$, $R_4$, $R_5$ and $R_7$ have the above mentioned meanings.

(b) A compound of the formula

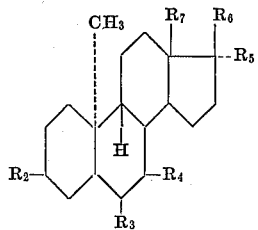

(VII)

in which formula:

$R_2$ represents a 3-keto-4-dehydro-3-keto-4,6-bisdehydro stream,
$R_3$ represents a hydrogen atom, a halogen atom or a lower alkyl group,
$R_4$ represents a hydrogen atom or a 6,7-methyl group,
$R_5$ represents a hydrogen atom, a hydroxy-, alkoxy-, or acyloxy group,
$R_6$ represents an acetyl group, a hydroxylated acetyl group, an etherified or esterified hydroxylated acetyl group, a —CH(OH)—CH$_3$ group or an etherified or esterified —CH(OH)—CH$_3$ group, and $R_7$ represents an alkyl- or alkenyl group, each group containing from 2–3 carbon atoms, is subjected to microbiological 1-dehydrogenation.

(c) A compound of the formula

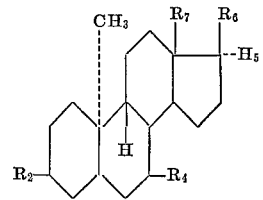

(VIII)

in which formula:

$R_2$ represents a 3-keto-4-dehydro-3-keto-4,6-bisdehydro system,
$R_3$ represents a hydrogen atom, a halogen atom or a lower alkyl group,
$R_4$ represents a hydrogen atom or a 6,7-methylene group,
$R_5$ represents a hydrogen atom, a hydroxy-, alkoxy- or acyloxy group,
$R_6$ represents an acetyl group, a hydroxylated acetyl group, an etherified or esterified hydroxylated acetyl group, a —CH(OH)—CH$_3$ group or an etherfied or esterified —CH(OH)—CH$_3$ group, and
$R_7$ represents an alkyl- or alkenyl group, each group containing from 2–3 carbon atoms, is subjected to direct 1,2-dehydrogenation.

(d) A compound of the formula

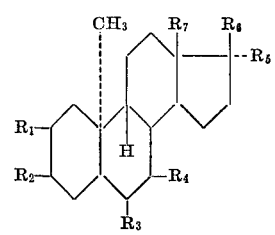

(IX)

in which formula:

$R_1$ represents a halogen atom,
$R_2$ represents a 3-keto-4-dehydro-, a 3-keto-4,6-bisdehydro system,
$R_3$ represents a hydrogen atom, a halogen atom or a lower alkyl group,
$R_4$ represents a hydrogen atom or a 6,7-methylene group,
$R_5$ represents a hydrogen atom, a hydroxy-, alkoxy- or acyloxy group,
$R_6$ represents an acetyl group, a hydroxylated acetyl group, an etherified or esterified hydroxylated acetyl group, a —CH(OH)—CH$_3$ group or an etherified or esterified —CH(OH)—CH$_3$ group, and
$R_7$ represents an alkyl- or alkenyl group, each group containing from 2–3 carbon atoms, is subjected to selective 1,2-dehydrohalogenation.

(e) A compound of the formula

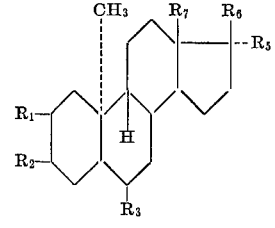

(X)

in which formula:

$R_1$ represents a hydrogen atom, or a 1,2-methylene group,
$R_2$ represents a 3-keto-4-dehydro-, 3-keto-1,4-bisdehydro system,
$R_3$ represents a hydrogen atom, a halogen atom or a lower alkyl group,
$R_5$ represents a hydrogen atom, a hydroxy-, alkoxy- or acyloxy group,
$R_6$ represents an acetyl group, a hydroxylated acetyl group, an etherified or esterified hydroxylated acetyl group, a —CH(OH)—CH$_3$ group or an etherified or esterified —CH(OH)—CH$_3$ group, and R$_7$ represents an alkyl- or alkenyl group, each group containing from 2–3 carbon atoms, is subjected to direct 6,7-dehydrogenation.

(f) A compound of the formula

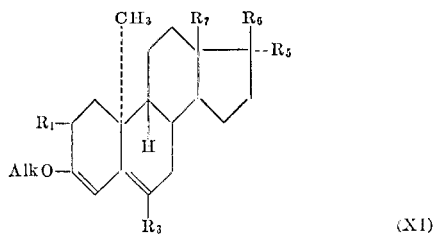

(XI)

in which formula:

R$_1$ represents a hydrogen atom, or a 1,2-methylene group,

R$_3$ represents a hydrogen atom, a halogen atom or a lower alkyl group,

R$_5$ represents a hydrogen atom, a hydroxy-, alkoxy- or acyloxy group,

R$_6$ represents an acetyl group, a hydroxylated acetyl group, etherified or esterified hydroxylated acetyl group, a —CH(OH)—CH$_3$ group or an etherified or esterified —CH(OH)—CH$_3$ group, R$_7$ represents an alkyl- or alkenyl group, each group containing from 2–3 carbon atoms, and OAlk represents an alkoxy group, is subjected to reaction with 2,3-dichloro-5,6-dicyanobenzoquinone, halogen substituted benzoquinone, manganese dioxide or tertiary butylchromate to produce a compound of the formula

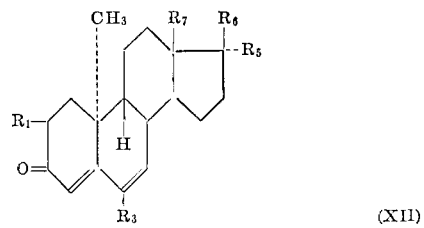

(XII)

in which formula R$_1$, R$_3$, R$_5$, R$_6$ and R$_7$ have the meanings indicated above.

(g) A compound of the formula

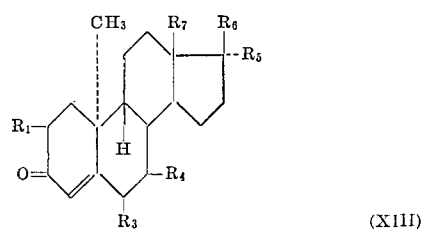

(XIII)

in which formula:

R$_1$ represents a hydrogen atom or a 1,2-methylene group,

R$_3$ represents a hydrogen atom, a halogen atom or a lower alkyl group, whereby the carbon atom at position 6 at least contains one hydrogen atom, R$_4$ represents a hydrogen atom or a 6,7-methylene group, R$_5$ represents a hydrogen atom, a hydroxy-, alkoxy- or acyloxy group, R$_6$ represents an acetyl group, a hydroxylated acetyl group, an etherified or esterified hydroxylated acetyl group, a —CH(OH)—CH$_3$ group or an etherified or esterified —CH(OH)CH$_3$ group, and R$_7$ represents an alkyl- or alkenyl group, each group containing from 2–3 carbon atoms, is subjected to an enoletherification reaction of the keto oxygen atom at carbon atom 3 to produce a compound of the formula

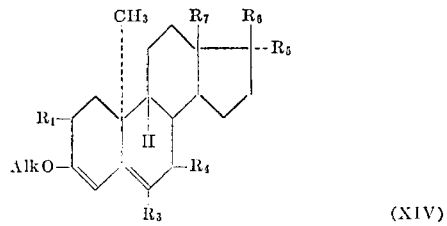

(XIV)

wherein:

R$_1$ represents a hydrogen atom or a 1,2-methylene group,

R$_3$ represents in combination with R$_4$ a 6,7-methylene group, or R$_3$ represents a hydrogen atom a halogen atom or a lower alkyl group and R$_4$ represents a hydrogen atom, R$_5$ represents a hydrogen atom, a hydroxy-, alkoxy- or acyloxy group, R$_6$ represents an acetyl group, a hydroxylated acetyl group, an etherified or esterified hydroxylated acetyl group, a —CH(OH)—CH$_3$ group or an etherified or esterified —CH(OH)—CH$_3$ group, R$_7$ represents an alkyl- or alkenyl group, each group containing from 2–3 inclusive carbon atoms, and OAlk represents an alkoxy group.

(h) A compound of the formula

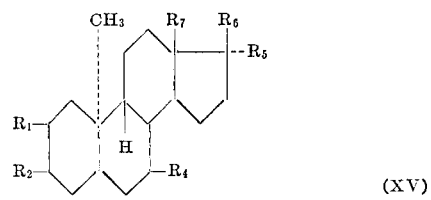

(XV)

in which formula:

R$_1$ represents a hydrogen atom or a 1,2-methylene group,

R$_2$ represents a 3-alkoxy-3,5-bisdehydro-, a 3-acyloxy-3,5-bisdehydro-, or a 3-keto-4-dehydro system, R$_4$ represents a hydrogen atom or a 6,7-methylene group, whereby the carbon atom at position 6 at least contains one hydrogen atom, R$_5$ represents a hydrogen atom, a hydroxy-, alkoxy- or acyloxy group, R$_6$ represents an acetyl group, a hydroxylated acetyl group, an etherified or esterified hydroxylated acetyl group, a —CH(OH)—CH$_3$ group or an etherified or esterified —CH(OH)—CH$_3$ group, and R$_7$ represents an alkyl- or alkenyl group, each group containing from 2–3 carbon atoms, is subjected to a halogenation reaction to introduce halogen at carbon atom 6, whereby a compound of the formula

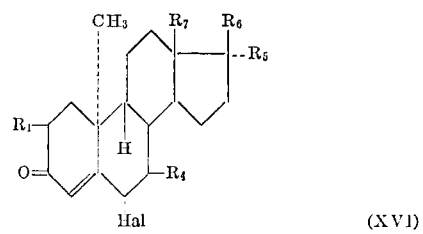

(XVI)

in which formula:

R$_1$ represents a hydrogen atom or a 1,2-methylene group,

R$_4$ represents a hydrogen atom or a 6,7-methylene group,

R$_5$ represents a hydrogen atom, a hydroxy-, alkoxy- or acyloxy group,

R$_6$ represents an acetyl group, a hydroxylated acetyl group, an etherified or esterified hydroxylated acetyl group, a —CH(OH)—CH₃ group or an etherified or esterified —CH(OH)—CH₃ group, R₇ represents an alkyl- or alkenyl group, each group containing from 2-3 inclusive carbon atoms, and Hal represents a halogen atom, is produced.

(i) A compound of the formula

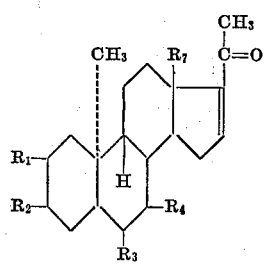

(XVII)

in which formula:

R₁ represents a hydrogen atom, or a 1,2-methylene group.
R₂ represents a
- 3-keto-4-hehydro-
- 3-keto-1,4-bisdehydro-
- 3-keto-4,6-bisdehydro-
- 3-keto-1,4,6-trisdehydro-
- 3-OR-4-dehydro or a
- 3-OR-4,6-bisdehydro system wherein:
R stand for a hydrogen atom, an alkyl- or an acryl group, R₃ represents a hydrogen atom, a halogen atom or a lower alkyl group, R₄ represents a hydrogen atom or a 6,7-methylene group, and R₇ represents an alkyl- or alkenyl group, each group containing 2-3 carbon atoms, is subjected to epoxidation followed by reaction with a halogen-halide to produce the corresponding 17α-hydroxy-16-halogeno compound, followed by dehalogenation by means of catalytic reduction with Raney nickel, to produce a compound of the formula

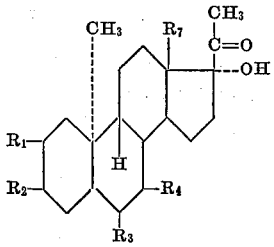

(XVIII)

in which formula R₁, R₂, R₃, R₄ and R₇ have the above mentioned meanings.

(j) A compound of the formula

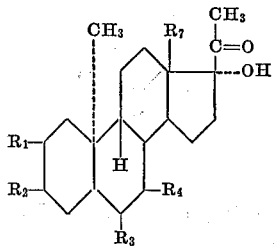

(XIX)

in which formula:

R₁ represents a hydrogen atom or a 1,2-methylene group,
R₂ represents a
- 3-keto-4-hehydro-
- 3-keto-1,4-bisdehydro-
- 3-keto-4,6-bisdehydro-
- 3-keto-1,4,6-trisdehydro-
- 3-OR-4-dehydro-
- 3-OR-4,6-bisdehydro-
- 3-OR-4,6-bisdehydro-
- 3-OR'-2,4,6-trisdehydro system wherein:
R is a hydrogen atom, an alkyl- or an acyl group and
R' is an alkyl- or acyl group, R₃ represents a hydrogen atom, a halogen atom or a lower alkyl group, R₄ represents a hydrogen atom or a 6,7-methylene group, and R₇ represents an alkyl- or alkenyl group, each group containing from 2-3 carbon atoms, is subjected to an etherification or esterification reaction at the hydroxy group at carbon atom 17.

(k) A compound of the formula

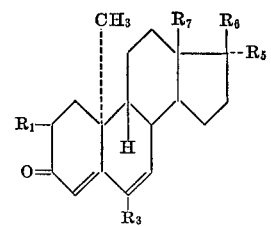

(XX)

in which formula:

R₁ represents a hydrogen atom or a 1,2-methylene group,
R₃ represents a hydrogen- or a halogen atom,
R₅ represents a hydrogen atom, a hydroxy-, alkoxy- or acyloxy group,
R₆ represents an acetyl group, a hydroxylated acetyl group, an etherified or esterified hydroxylated acetyl group, a CH(OH)—CH₃ group or an etherified or esterified —CH(OH)—CH₃ group, and
R₇ represents an alkyl- or alkenyl group, each group containing from 2-3 carbon atoms, is reacted with dimethylsulphoxonium methylide to produce the corresponding 6β,7β-methylene-9β,10α-steroid.

(1) A compound of the formula

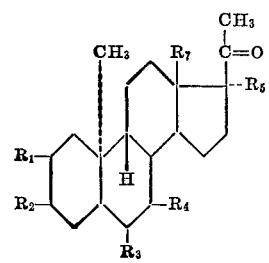

(XXI)

in which formula:

R₁ represents a hydrogen atom or a 1,2-methylene group,
R₂ represents a:
- 3-keto-4-dehydro-
- 3-keto-1,4-bisdehydro-
- 3-keto-4,6-bisdehydro- or a
- 3-keto-1,4,6--trisdehydro system R₃ represents a hydrogen atom, a halogen atom or a lower alkyl group, R₄ represents a hydrogen atom or a 6,7-methylene group, R₅ represents a hydrogen atom, a hydroxy-, alkoxy- or acyloxy group, and R₇ represents an alkyl- or alkenyl group, each group containing from 2-3 inclusive carbon atoms, is subjected to a reduction reaction to convert a 20-keto oxygen atom to a 20-hydroxy group, followed by the oxidation of the intermediately formed 3-hydroxy group.

(m) A compound of the formula

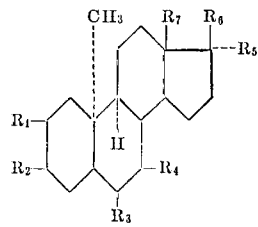

(XXII)

in which formula:

R₁ represents a hydrogen atom or a 1,2-methylene group,
R₂ represents a:
- 3-keto-4-dehydro-
- 3-keto-1,4-bisdehydro-
- 3-keto-4,6-bisdehydro-
- 3-keto-1,4,6-trisdehydro-
- 3-OR-4-dehydro-
- 3-OR-4,6-bisdehydro-
- 3-OR′-3,5-bisdehydro- or a
- 3-OR′-2,4,6-trisdehydro system wherein:
R is a hydrogen atom, an alkyl- or an acyl group, and
R′ is an alkyl- or acyl group, R₃ represents a hydrogen atom, a halogen atom or a lower alkyl group,
R₄ represents a hydrogen atom or a 6,7-methylene group,
R₅ represents a hydrogen atom, a hydroxy-, alkoxy- or acyloxy group,
R₆ represents a hydroxylated acetyl group or a
—CH(OH)—CH₃
group, and
R₇ represents an alkyl- or alkenyl group, each group containing from 2–3 carbon atoms, is subjected to an etherification- or an esterification reaction of the hydroxy group of the R₆ substituent.

(n) A compound of the formula

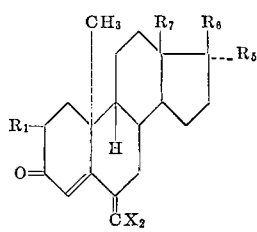

(XXIII)

in which formula:

R₁ represents a hydrogen atom or a 1,2-methylene group,
R₅ represents a hydrogen atom, a hydroxy-, alkoxy- or acyloxy group,
R₆ represents an acetyl group, a hydroxylated acetyl group, an etherified or esterified hydroxylated acetyl group, a —CH(OH)—CH₃ group or an etherified or esterified —CH(OH)—CH₃ group,
R₇ represents an alky or alkenyl group, each group containing from 2–3 inclusive carbon atoms, and
X represents a hydrogen atom or a halogen atom, selected from the group containing of chlorine atom and bromine atom, is catalytically hydrogenated to produce the corresponding 6-methyl steroid compound.

(o) A compound of the formula

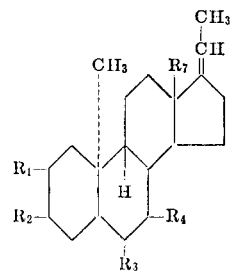

(XXIV)

in which formula:

R₁ represents a hydrogen atom or a 1,2-methylene group,
R₂ represents a:
- 3-keto-4-dehydro-
- 3-keto-1,4-bisdehydro-
- 3-keto-4,6-bisdehydro- or a
- 3-keto-1,4,6-trisdehydro system R₃ represents a hydrogen atom, a halogen atom or a lower alkyl group,
R₄ represents a hydrogen atom or a 6,7-methylene group,
R₇ represents an alkyl- or alkenyl group, each group containing from 2–3 inclusive carbon atoms, is subjected to an oxygenation reaction to produce a compound of the formula

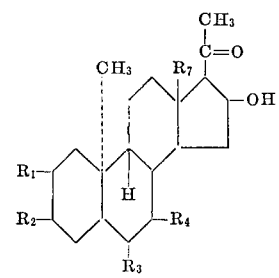

(XXV)

in which formula R₁, R₂, R₃, R₄ and R₇ have the above mentioned meanings.

The intermediate products according to the invention and represented by the formula

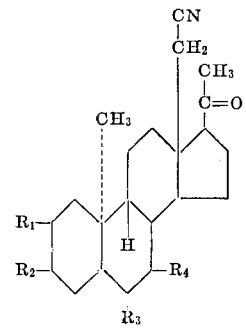

(II)

wherein:

R₁ represents a hydrogen atom or a 1,2-methylene group,
R₂ represents a:
- 3-keto-4-dehydro-
- 3-keto-1,4-bisdehydro-
- 3-keto-4,6-bisdehydro- or a
- 3-keto-1,4,6-trisdehydro system R₃ represents a hydrogen atom, a halogen atom or a lower alkyl group and
R₄ represents a hydrogen atom or a 6,7-methylene group
may be prepared according to methods known for the preparation of analogous compounds.

Thus the compounds may be prepared by reaction of a compound of the formula

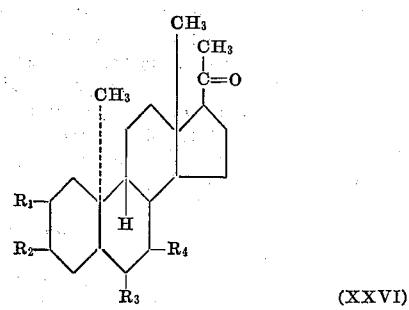

in which formula $R_1$, $R_2$, $R_3$ and $R_4$ have the meanings given above, with HCN to produce the corresponding, 20-hydroxy-20-cyano-compound, followed by irradiation in the presence of iodine and lead-tetra-acetate to produce a compound of the formula

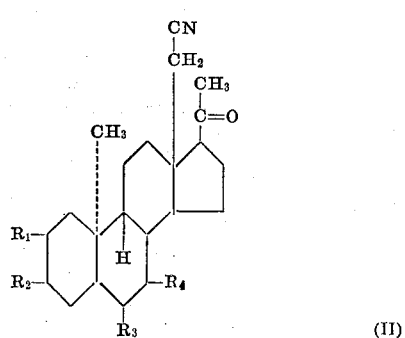

wherein $R_1$, $R_2$, $R_3$ and $R_4$ have the meaning indicated above.

The methods enumerated above may be described in more detail herebelow, whereby a literature survey of the methods which are known for the introduction of substituents in steroids will be given. The expression steroid in this survey is used to say that the known methods have been described in literature in relation to either normal or to 9β,10α-steroids and to indicate that these methods can be applied to 9β,10α-steroids to prepare the compounds of the underlying invention. The letters a–o inclusive refer to the corresponding paragraphs a–o indicated before.

(ad. a) The preparation of the starting products of the reaction described under (a) can be exemplified by the following procedure: a compound of the formula

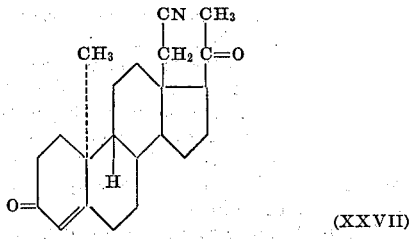

is ketalized with ethylene glycol in the presence of a catalyst whereby the corresponding 5-dehydro-3,20-ketalized-dione is produced, followed by the reduction with di-iso-butyl-aluminiumhydride (DIBAH) to obtain a compound of the formula

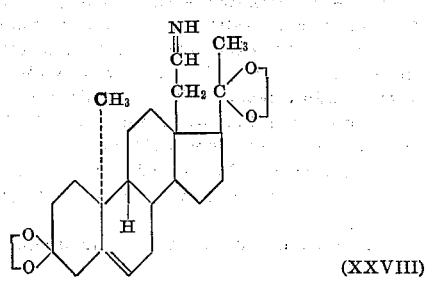

This aldimine compound can be converted to the desired starting products by subjecting the said compound to a Huang-Minlon reduction, or by hydrolysing the aldimine group to a formyl group, followed by a reaction with triphenyl-phosphine-methylene, whereby the oxygen atom of the formyl group is replaced by a methylene group, or by hydrolysing the aldimine group to a formyl group, subsequent reaction with triphenyl-phosphine-methylene, followed by catalytic hydrogenation.

The mentioned ketalisation reaction may be carried out at a temperature of 50–150° C. in the presence of a catalyst such as p-toluenesulphonic acid and preferably in a solvent such as aromatic hydrocarbons, for example benzene or a mixture of aliphatic and aromatic hydrocarbons. The reduction of the nitril compound to the aldimine compound (Formula XXVIII) is realized with diisobutyl-aluminium-hydride (DIBAH), in the presence of a solvent such as aliphatic or aromatic hydrocarbons, e.g. toluene, at a reaction temperature of −20 till +50° C. and preferably at a temperature of −5 till +5° C.

The obtained aldimine compound may be hydrolized to the corresponding 18-formyl-compound and subsequently subjected to a Huang-Minlon reduction with hydrazine to produce the 18-methyl compound, followed by deketalization. The Huang-Minlon reduction is carried out in a solvent such as glycols e.g. ethylene glycol, under atmospheric pressure and at a temperature of 200° C.– 300° C. In a preferred embodiment of the invention the aldimine compound of Formula XXVIII is directly subjected to the Huang-Minlon reduction and subsequently deketalized to obtain 18-methyl-9β,10α-pregn-4-ene-3,20-dione.

To obtain 18-ethylene-9β,10α-pregn-4-ene-3,20-dione, the aldimine compound of Formula XXVIII may be hydrolized and subsequently treated with triphenyl-phosphine-methylene, followed by deketalization.

The reaction of carbonyl compounds with triphenyl-phosphinemethylene is kell-known (Fieser and Fieser, "Organic Chemistry," page 651). The corresponding 18-ethyl-steroid compound may be prepared by hydrogenation of the compound obtained by the reaction with tri-phenyl-phosphine-methylene, prior to deketalisation.

Literature concerning the ketalisation reaction, the DIBAH reduction and the Huang-Minlon reduction: J. J. Brown c.s. "Exp." 18, 309 (1962); "J. A. Chem. Soc.," 86, 2183 (1964) Dutch Patent 99,527, N. V. Philips' Gloeilampenfabrieken. L. J. Zakharkin and I. M. Khorline, "Dokl, Akad. Nank" SSSR, 116 p. 422 (1967), U.S. Patent 3,207,733, W. L. Meyer c.s., "Tetrahedron Letters," 1966, p. 4255 Literature for the irradiation reaction: J. Kalvoda, Ch. Meystre und G. Anner, Helv. Chim. Acta 49, 424 (1966).

INTRODUCTION OF Δ¹-DOUBLE BOND (ad. b) By microbiological 1-dehydrogenation with *Corynebacterium simplex*, A. Nobile et al., J. Am. Chem. Soc. 77, 4184 (1955).

(ad. c) By direct 1-dehydrogenation (1) with iodine pentoxide or periodic acid, Dutch patent applications 215,154 and 211,626, (2) with selenium dioxide, J. H. Fried et al., J. Chem. Soc. 81, 1235 (1959), A. Bowers et al., J. Am. Chem. Soc. 81, 5991 (1959), (3) with chloranil e.g. for the conversion of 3-keto-1,4,6-trisdehydro-steroids, E. J. Agnello and G. D. Laubach, J. Am. Chem. Soc. 82, 4293 (1960), (4) with 2,3-dichloro-5,6-dicyanobenzoquinone, D. Burn et al., Proc. Chem. Soc. 1960, 14, (5) by dehydrogenation of 3-keto-steroids with lead-tetra-acetate, R. L. Clarks, J. Am. Chem. Soc. 77, 661 (1955), R. Joly, Bull. Soc., 366 (1958).

(ad. d) By selective 1,2-dehydrohalogenation of 2-halo-3-keto-steroids e.g. with an organic base such as collidine or with lithium bromide and lithium carbonate in dimethylformamide, C. Djerassi, J. Am. Chem. Soc., 71, 1003 (1949).

The substituent $R_1$=halogen, may be prepared by halogenation of a 3-keto-steroid e.g. with N-bromosuccinimide or bromine (bromination in allylic position with respect to the 3-keto oxygen atoms).

INTRODUCTION OF $\Delta^6$-DOUBLE BOND (ad. e) By direct 6 - dehydrogenation of 3 - keto-4-dehydro-retrosteroids (1) with substituted benzoquinones, such as choranil, (E. J. Agnello and G. D. Laubach, J. Am. Chem. Soc. 82, 4293 (1960) or Bowers, J. Am. Chem. Soc. 81, 5991 (1959)), or 2,3-dichloro-5,6-dicyano-benzoquinone (H. J. Ringold and A. Turner, Chem. and Ind., 1962, 211), (2) with manganese dioxide, (F. Sondheimer et al., J. Am. Chem. Soc. 75, 5932 (1953)).

(ad. f.) (1) By reaction of a $\Delta^{3,5}$-3-enolether-steroid with 2,3-dichloro-5,6-dicyanobenzoquinone, German Pat. 1,044,077, (2) by reaction of $\Delta^{3,5}$-3-enolether-6-halosteroids with a halogen substituted benzoquinone such as 2,3-dichloro-5,6-dicyano-benzoquinone, South African patent specification SA 62/3118, (3) oxidation of 3-enolether-3,5-bisdehydro-6-halo steroids with tert.-butylchromate gives 3 - keto - 4,6 - bisdehydro-6-halo-steroids, K. Yasuda, Chem. Phar. Bull 11, 1167 (1963).

(ad. g.) Enoletherification of a 3-keto-4-dehydro (or a 3-keto-5-dehydro)-steroid with an alcohol in the presence of a catalyst, e.g. with benzylalcohol in the presence of p-toluene sulphonic acid, (S. Bernstein et al. J. Org. Chem. 18, 1166 (1953)) or with an orthoformate ester in the presence of a catalyst, e.g. with ethylorthoformate and hydrochloric acid (A. Serini et al., Ber. 71, 1766 (1938) or ethylorthoformate with p-toluene sulphonic acid (R. Gardi et al., J. Org. Chem. 27, 688 (1962) and A. D. Cross et al., Steroids 6, 198 (1963)) or with a dialkoxy propane, e.g. with dimethoxy propane in methanol-dimethyl-formamide, in the presence of a catalyst such as p-toluene sulphonic acid, (A. L. Nussbaum et al., J. Org. Chem. 26, 3925 (1961)).

INTRODUCTION OF 6-HALOGEN (ad. h.) By substitution halogenation at carbon atom 6 with N-halo imides such as bromosuccinic imide or with halogens such as bromine, (C. Djerassi et al., J. Am. Chem. Soc. 72, 4534 (1950)) (1) by halogenation of a 3,5-bisdehydro-3-enolether steroid with e.g. halogens, such as chlorine, bromine, (L. H. Knox, J. Am. Chem. Soc. 82, 1230 (1960)), or with N-halo imides, such as N-bromosuccinic imide (Lit. idem) or with perchlorylfluoride, (S. Nakanishi, J. Am. Chem. Soc. 81, 5259 (1959)). (2) By halogenation of a 3,5-bisdehydro-3-enolester steroid with e.g. halogens, such as chlorine, (H. H. Inhoffen, C.A. 53, 456 (1959)) or with N-halo imides (C. Djerassi, J. Am. Chem. Soc. 77, 3827 (1955)) or with perchlorylfluoride, (B. M. Bloom, Chem.a.Ind. 1959, 1317).

INTRODUCTION OF THE 17α-HYDROXY (OR ETHERIFIED OR ESTERIFIED HYDROXY (ad. i.) By epoxidising a 17β-acetyl-16-dehydro-steroid and reaction of the epoxide with a hydrogen halide followed by dehalogenating the 16-halogeno-17β-acetyl-17α-hydroxy compound thus produced, by means of catalytic reduction with Raney nickel.

(ad. j.) By esterification or etherification reaction of the hydroxy group of a 17α-hydroxy-20-keto-pregnane as described in Belgian patent specification 577,615.

INTRODUCTION OF A 6,7-METHYLENE GROUP (ad. k.) The dimethyl sulphoxonium reagent is prepared by reaction of trimethyl sulphoxonium iodide with a base e.g. alkali hydrides or hydroxides in the presence of a solvent e.g. dimethyl sulphoxide.

The reaction for the preparation of the inventive compounds is carried out in the presence of a solvent at a reaction temperature between 0–80° C., and preferably between 15–30° C. Suitable solvents are dimethyl sulphoxide, ethers, tetrahydrofuran, dioxan or mixtures thereof.

(ad. l.) The 20-keto oxygen atom may be reduced with agents known for this type of reactions, for example with LiAlH$_4$ or with an alkalimetal in absolute ethanol or propanol-2. It will be understood that the 3-keto oxygen atom will also be reduced to a hydroxy group, and it is therefore desirable that the primary reduction is followed by a selective oxidation of the intermediately formed 3-hydroxy group to a 3-keto oxygen atom. Oxidation agents which may be used for this purpose are f.e. substituted benzoquinones such as chloranil or 2,3-dichloro-5,6-dicyano benzoquinone (D.D.Q.).

(ad. m.) It may be clear that many methods for the esterification of an organic hydroxylated compound are known in the art. Use can be made for example of the reaction with an acid halogenide in the presence of an acid binder such as pyridine or collidine.

(ad. n.) The catalytic hydrogenation can be performed by the use of several well known hydrogenation catalyst, such as for example palladium suspended on a substrate e.g. on carbon, CaCO$_3$, BaSO$_4$ on SrCO$_3$. The starting materials of the method (n) wherein X represents a hydrogen atom may be prepared by the so-called Vilsmeyer reaction.

According to the Vilsmeyer reaction a 3-alkoxy-3,5-diene-9β,10α-steroid is reacted with dimethylformamide and phosgene. After hydrolysis of an intermediately produced iminium compound the corresponding 6-formyl-3-alkoxy-3,5-diene is produced.

By catalytic reduction or by reduction with sodium- or lithium borohydride the corresponding 6-hydroxymethyl-3-alkoxy-3,5-diene is obtained. Subsequent treatment of the latter compound with aqueous diluted acid results into hydrolysis of the enolether group and simultaneously of dehydration of the 6-hydroxymethyl group. Preferably the reaction is carried out in a medium of aqueous diluted acetic acid or hydrochloric or sulphuric acid in a medium of a lower alkanol, e.g. methanol.

The starting compounds wherein X represents a chlorine or bromine atom may be prepared by reacting an enolether of a 3-keto-4-dehydro steroid with tetra-halomethane e.g. with trichloromonobromomethane or with tetra-bromomethane and splitting off hydrogen chloride or hydrogen bromide respectively from the 3-keto-4-dehydro-6-trichloro (or tribromo)-methyl-steroid (Lissberg, Tetrahedron 9, 149 (1960)). The latter part of the reaction is preferably carried out with a basic anion exchanger of the type "Dowex-1" or with alkali alkoxide in alkanol, e.g. with sodium methoxide in boiling methanol.

(ad. o.) The oxygenation may be performed with for example osmium tetraoxyde in the presence of hydrogen peroxide or preferably in the presence of aminoxide-peroxide, as described in Dutch patent application 195533.

With respect to the method for the preparation of the intermediate products of the general Formula II, it should be observed that the addition of HCN to the starting product of Formula XXVI may be carried out at a temperature of −20 to +10° C. and preferably at a temperature of 0° C., in the presence of inert solvents such as alcohols and ethers.

The HCN reagent may be added as such to the solution of the steroid compound, but may also be developed in the reaction mixture for example by adding aceton-cyanohydrin and a base to the steroid-solution.

To attack the 13-methyl group the cyanohydrin compound was irradiated with a 1000-watt daylight lamp in the presence of iodine, calcium carbonate, lead tetraacetate and cyclohexane. The cyclohexane acts as a diluent of the reagents. Generally use may be made of hydrocarbons with a boiling point of 80° C. and higher. Surprisingly the yield of the reaction was raised from 35% to 60–65% by adding some methylene chloride to the reaction mixture. The reaction may be carried out at a temperature of 50–150° C. but preferably at a temperature between 75–100° C.

The introduction of other substituents in the steriod nucleus than those already described under the methods a–o, which substituents may be present in the starting products for the methods (a–o), may be carried out according to methods known for introducing these substituents in normal steriods, for example:

INTRODUCTION OF A 3-HYDROXY (OR ETHERIFIED OR ESTERIFIED HYDROXY)

A 3-keto oxygen atom may be reduced in the normal manner for example with $LiAlH_4$ or with an alkali metal and absolute ethanol or propanol-2 to produce the 3-hydroxy steriod.

The 3-hydroxy steroid may be esterified by reacting the hydroxy group containing compound with an acid chloride in the presence of pyridine or collidine as an acid binder and in the presence of an inert solvent for example benzene or petroleum-ether.

Etherification may be carried out by reacting a hydroxy steriod with an alcohol in the presence of a catalyst, such as for example an inorganic acid or p-toluenesulphonic acid.

INTRODUCTION OF A 20-KETO-21-HYDROXY GROUP

This type of substitutent is produced when a steroid having an acetyl group at carbon atom 17 is reacted with lead-tetra-acetate or subjected to hydroxylation at position 21 with micro organisms, for example with *Ophiobolus herpotrichus*.

Further this type of substituent is produced when a 17-acetyl steriod is subjected to the following sequence of reactions:

(1) Condensation under anhydrous conditions of a 17-acetyl-steroid with a dialkyl ester of oxalic acid in the presence of an alkali-metal alkoxide, for example diethyl oxalic ester and sodium methanolate;

(2) Halogenation of the condensation product with molecular halogen, preferably bromine or iodine, in the presence of a solvent, preferably methanol or ethanol;

(3) Decomposition of the product of the halogenation reaction with an alkali-metal alkoxide for example sodium methoxide in methanol to produce a 17-acetyl steriod halogenated at carbon atom 21;

(4) Acylation under anhydrous condition of the 21-halogeno compound with a dispersion of an alkali- or earth alkali salt of an organic carboxylic acid to produce a 17-acetyl-21-acyloxy steriod;

(5) Saponification of the 21-esterified hydroxy group to produce a 20-keto-21-hydroxy-pregnane.

Of all the numerous methods listed herebefore some deserve emphasis due to their particular usefulness. Thus, the introduction of a double bond at carbon atoms 1 and 2, is preferably carried out with selenium dioxide or with 2,3-dichloro-5,6-dicyanobenzoquinone. The starting materials in this reaction contain a 3-keto-4-dehydro-, a 3-keto-4,6-bisdehydro-system, a fluoro-, chloro- or bromo atom at carbon atom 6, the —(β)—CO—CH group at carbon atom 17 and in α-position at carbon atom 17 a hydrogen atom or an esterified or an etherified hydroxy group. The products resulting from this reaction contain the corresponding groups and besides this a double bond at carbon atom 1.

According to another preferred method a double bond at carbon atom 1 is introduced by dehydrohalogenating with lithiumbromide and lithiumcarbonate in dimethylformamide a 2-halogeno-9β,10α-steroid which contains a 3-keto-4-dehydro or a 3-keto-4,6-bisdehydro-system and a fluoro-, chloro- or bromo atom at carbon atom 6 and the —CO—CH$_3$ group at carbon atom 17 in β-position and a hydrogen atom or an esterified or etherified hydroxy group at carbon atom 17 in α-position. According to this process the same products are prepared as according to the method described in the foregoing paragraph. It should be mentioned that when $R_3$ represents a 3-keto-4-dehydro system and the halogen atom at carbon atom 6 is a chlorine or bromine atom that the halogen atom at carbon atom 2 preferably is an iodine atom.

According to a further preferred method a 6-dehydrobond is introduced into a 9β,10α-steroid containing a 3-keto-4-dehydro-system, a fluoro-, chloro- or bromo atom in β-position at carbon atom 6, the β—CO—CH$_3$ group at carbon atom 17 and in α position at this carbon atom a hydrogen atom or an esterified or an etherified hydroxy group by direct dehydrogenation with 2,3-dichloro-5,6-dicyanobenzoquinone. The same dehydrogenation reaction may also with advantage be applied to the same starting materials in which however not a 3-keto-4-dehydro but a 3-alkoxy-3,5-bisdehydro-system is present.

According to another preferred method a halogen atom at carbon atom 6 is introduced by using 3-acyloxy-3,5-bisdehydro-9β,10α-steroid as starting materials and which contain at carbon atom 17 in β-position the —CO—CH$_3$ group and in α-position a hydrogen atom or an esterified or an etherified hydroxy group. This preferred halogenation method is carried out with perchlorylfluoride or with an N-halo-imide, such as N-bromo- or N-chloro-succinimide or N-bromo- or N-chloro-acetamide or with molecular bromine or chlorine. The reaction results in the formation of 3-keto-4-dehydro-6-halo-9β,10α-steroids.

In certain cases it will be necessary to protect certain groups or functions in order to prevent the occurrence of side reactions during the main course of introduction of a substituent.

Thus, in reduction processes of for example a keto group, it may be necessary or at least desirable to protect any other keto oxygen atom present. This can be done by selective ketalising the same with ethylene glycol and hydrolising the ketal produced after the main reaction has taken place.

The compounds according to the invention may be worked up to pharmaceutical preparations in the usual manner.

Thus they may be compounded to tablets for oral take-up by mixing the compounds with inert carrier materials such as potato starch, lactose, together with fillers and/or binders or solid lubricants e.g. magnesium stearate, a carboxy-methyl cellulose. Injection liquids can be produced by dissolving a methylene chloride solution of an active compound in arachid oil and by subsequent evaporation of methylene chloride, while working under sterile conditions or by any other suitable method e.g. the one as described in the examples.

The invention may be illustrated by the following examples:

EXAMPE I 18-methyl-9β,10α-pregn-4-ene-3,20-dione (1) 20-hydroxy - 20 - cyano-9β,10α-pregn-4-en-3-one (compound A): A suspension of 25 g. of 9β,10α-pregn-4-ene-3,20-dione in 500 ml. of methanol was stirred for 1 hr. at room temperature. After cooling to 0°, 26 ml. of hydrogen-cyanide and 3,5 ml. of triethylamine were added.

After stirring for one hour at the same temperature the solution was stored for one night at —5°. To freeze the equilibriums 100 ml. of a 2 n $H_2SO_4$-solution were added and then the mixture was poured out into 600 ml. of methylenechloride at —5°. The organic layer was extracted three times with acidified water of 0°. The water washings were extracted two times with methylen-chloride of 0° and the combined organic layers were washed again three times with acidified water. After drying and evaporation of the solvent a crystalline residue (27 g.) resulted. Recrystallization from methylenechloride gave 23.5 g. pure material. Due to decomposition by heating the purity of the compound was a.o. determined by t.l.c. (melting points are found between 158 and 218°); $[\alpha]_D^{25} = -125°$ (c.=0.39); $\epsilon 241 = 16,400$.

(2) 18-cyano-9β,10α pregn - 4 - ene-3,20-dione (compound B): In a 4 litre 3-necked round-bottom flask equipped with a stirrer and a reflux condenser a suspension of 60 grams of lead tetra-acetate and 20 g. of calciumcarbonate in 2 litres of cyclohexane was refluxed for one hour on a Philips-1000 watt lamp. After cooling till ±40° C. 7.5 g. of iodine and a solution of 10 g. of compound A in 300 ml. of methylenechloride were added and the solution was irradiated with the 1000-watt lamp under vigorous stirring till the iodine colour was disappeared (~1¾ hrs.). After cooling the solid material was filtered off. The filtrate was washed with a concentrated solution of sodiumthiosulfate (2×) and with water. The solid material was boiled with methylene-chloride and filtered off again. Also this filtrate was washed with a concentrated solution of sodiumthiosulfate (2×) and with water. The two filtrates were mixed and dried. The solvent was removed under reduced pressure. A crude chromatography on silicagel furnished a separation between relative polar and apolar compounds. The apolar compounds (~15% yield) contained a.o. 17-iodo-9$\beta$,10$\alpha$-androst-4-en-3-one. The relative polar compounds were chromatographed on silicagel.

Crystallization from acetone-n.hexane furnished 5.1 g. of 18-cyano-9$\beta$,10$\alpha$-pregn-4-ene-3,20-dione; M.P. 121.5–122.5°; $[\alpha]_D^{25} = -59°$ (c.=0.50); $\epsilon 241 = 16,600$; C.D. $\Delta\epsilon = +3.17$ (dioxan).

(3) 3,3;20,20-bisethylenedioxy - 18 - cyano-9$\beta$,10$\alpha$-pregn-5-ene (compound C): 10 g. of compound B were dissolved in 500 ml. of benzene. To this solution 80 ml. of ethylene glycol and 400 mg. of p-toluenesulfonic acid were added. Under a nitrogen atmosphere this solution was refluxed in a Soxhlet apparatus containing powdered barium oxide. The reaction was stopped after 6 hours and after cooling benzene was added. Washing with water, drying with sodiumsulfate and evaporation of the solvent gave a residue which was dissolved in 500 ml. of methanol. To this solution 50 ml. of a 10% magnesium sulfate. 8 H$_2$O solution in water were added and the mixture was refluxed for 1¼ hrs. After concentration the solution was poured out into water. After extraction with methylenechloride and washing with water the solution was dried and the solvent removed under reduced pressure. Crystallization from acetone-ether gave 3.4 g. of the mono-ketal 20,20-ethylenedioxy-18-cyano-9$\beta$,10$\alpha$-pregn-4-en-3-one.

The mother liquor was chromatographed on silicagel; affording another 3.5 g. of the monoketal and 4.8 g. of 3.3; 20,20 - bisethylenedioxy-18-cyano - 9$\beta$,10$\alpha$ - pregn-5-ene.

Crystallization from acetone-n.hexane gave pure 3,3; 20,20-bisethylenedioxy-18-cyano-9$\beta$,10$\alpha$-pregn-5-ene, with M.P. 157–158°; $[\alpha]_D^{20} = +29°$ (c.=1.0).

(4) 3,3;20,20-bisethylenedioxy - 18 - formyl-9$\beta$,10$\alpha$-pregn-5-ene (compound D): 5 g. of compound C were dissolved in 150 ml. of dry toluene and cooled to 0°. In the course of 5 minutes a solution of 3.1 ml. of diisobutyl-aluminiumhydride in 60 ml. of toluene was added under a nitrogen atmosphere. The excess of DIBAH was destroyed with ethanol. Boiling the mixture with water for three hours gave hydrolyses of the aldimine to the aldehyde. After cooling; the mixture was separated and the water-layer extracted with benzene. The organic layers were washed with water and dried. After evaporation of the solvent the crystalline residue was recrystallized from acetone-n.hexane yielding 2.8 g. of compound D. The mother-liquor was chromatographed on alumina yielding another 0.9 g. of compound D with: M.P. 132.5–133°; $[\alpha]_D^{19} = -27°$ (c.=0.1).

(5) 3,3;20,20-bisethylenedioxy - 18 - methyl-9$\beta$,10$\alpha$-pregn-5-ene (compound E): 5.2 g. of compound D were refluxed with 6 ml. of ethyleneglycol and 10 ml. of hydrazine hydrate (100%) during one hour in a nitrogen atmosphere. After cooling 6 g. of potassium-hydroxide in 6 ml. of water were added. The temperature was raised up till 220°. By this temperature the solution refluxed and refluxing was maintained during 2½ hours. After cooling methylenechloride and water were added. The water-layer was extracted with methylenechloride. The combined methylene-chloride layers were washed with water and dried. After evaporation of the solvent the residue was chromatographed on silicagel. Yield 4 g. of compound E with melting point 98.5–100.5° C.

(6) 18-methyl-9$\beta$,10$\alpha$-pregn-4-ene-3,20-dione: 3.9 g. of crude compound E were dissolved in 100 ml. of acetone and refluxed with 7 ml. of 2 n H$_2$SO$_4$ for one hour. After cooling the reaction mixture was poured out into water and extracted with methylene-chloride. The methylene-chloride layer was washed with water and dried with sodiumsulfate. After evaporation of the solvent the crystalline residue was recrystallized from acetone-n.hexane yielding 2.8 g. of 18 - methyl-9$\beta$,10$\alpha$-pregn-4-ene-3,20-dione; M.P. 119–119.5°; $[\alpha]_D^{25} = -62°$ (c.=0.42); $\epsilon 242 = 16,900$.

EXAMPLE II 18-methyl-9$\beta$,10$\alpha$-pregn-4-ene-3,20-dione 2 g. of 3,3;20,20-bisethylenedioxy-18-cyano-9$\beta$,10$\alpha$-pregn-5-ene (see Example I. 3), were dissolved in 60 ml. of dry toluene and cooled to 0°. In the course of 2 minutes a solution of 1.3 ml. (35% excess) of diisobutyl-aluminiumhydride in 26 ml. of toluene was added under a nitrogen atmosphere. The excess of DIBAH was destroyed with ethanol and water. This mixture was filtered over hyflo. The organic layer was separated from the water layer and dried with sodiumsulfate. After filtration and removing of the solvent under reduced pressure the residue was refluxed for one hour with 2.4 ml. of ethyleneglycol and 4 ml. of hydrazine hydrate (100%) in a nitrogen atmosphere. After cooling 2.4 g. of potassium-hydroxide in 2.4 ml. of water were added. The temperature was raised to 200° in an open round-bottom flask in half an hour and was then refluxed at 230° for two hours. After cooling methylenechloride and water were added. The water layer was extracted with methylenechloride. The combined methylenechloride layers were washed with water and dried. After evaporation of the solvent under reduced pressure the residue was dissolved in 100 ml. of acetone and 7 ml. of 2 n H$_2$SO$_4$. This solution was refluxed for one hour in a nitrogen atmosphere and then poured out into water. After extraction with methylene-chloride and washing of the organic layers with water the solution was dried with sodiumsulfate. After filtration and evaporation of the solvent under reduced pressure the residue was chromatographed on silicagel (50 g.). Yield 1.28 g. (88%) chromatographically pure 18-methyl-9$\beta$,10$\alpha$-pregn-4-ene-3,20-dione.

EXAMPLE III 18-methyl-9$\beta$,10$\alpha$-pregna-4,6-diene-3,20-dione 576 mg. of 18-methyl-9$\beta$,10$\alpha$-pregn-4-ene-3,20-dione (Example II) were dissolved in 14 ml. of dioxan/HCl (70 mg. HCl/ml.). Also 600 mg. of D.D.Q. were dissolved in 19 ml. of the same solvent (dioxan/HCl). These two solutions were brought together and stirred for 7 minutes under a nitrogen atmosphere. The mixture was then poured out into water and extracted with benzene-ether (1:1). The organic layers were washed with 1 n sodiumhydroxide solution (6 times), then washed with water and dried. After evaporation of the solvent the crude residue (460 mg.) was chromatographed on silicagel. After crystallization from acetone-n.hexane 280 mg. of 18-methyl-9$\beta$,10$\alpha$-pregna-4,6-diene-3,20-dione were isolated. Physical data: M.P. 171–172°; $\epsilon 285 = 25,800$.

EXAMPLE IV 18-vinyl-9$\beta$,10$\alpha$-pregn-4-ene-3,20-dione (1) 3,3';20,20' - bisethylenedioxy - 18 - vinyl - 9$\beta$,10$\alpha$-pregn-5-ene: To a suspension of 49 g. of triphenylfosfonium-methylbromide (138 mmol.) in 600 ml. of absolute tetrahydrofuran a solution of 96.5 ml. of butyllithium (containing 1.43 mmol. BuLi/ml.) was slowly added in a nitrogen atmosphere. After stirring for another 2 hours a solution of 5.9 g. (13.8 mmol.) of 3,3;20,20-bisethylenedioxy-18-formyl-9β,10α-pregn-5-ene in 360 ml. of absolute tetrahydrofuran was added slowly. After refluxing for 4 hrs. the solution was stirred at room-temperature overnight and then refluxed for another 4 hrs. After cooling the solution was poured out into 3 l. of ice-water. Extraction was performed with 1 l. portions (4×) of benzene-ether (1:1). The combined organic fractions were washed with water. After drying, filtration and evaporation of the solvent under reduced pressure the residue was chromatographed on a column of 150 g. of silicagel; eluens:benzene-ether. Yield 5.9 g. of crystalline 3,3′;20,20′-bisethylenedioxy-18-vinyl-9β,10α-pregn-5-ene. M.P. 105.5–106.5°; $[\alpha]_D^{25} = +37°$ (c.=0.98 in $CHCl_3$).

(2) 18-vinyl-9β,10α-pregn-4-ene-3,20-dione: 1.27 g. of 3,3′;20,20′-bisethylenedioxy-18-vinyl-9β,10α - pregn-5-ene were dissolved in 40 ml. of acetone and 2 ml. of a 2 n $H_2SO_4$ solution. This solution was refluxed for 1 hr. in a nitrogen atmosphere. After work-up (extraction with benzene/ether and washings with water) the solution was dried and then filtrated. After evaporation of the solvent the crystalline residue was recrystallized from acetone/hexane. Yield 725 mg. of crystals with a M.P. of 130–130.5°. $[\alpha]_D^{25} = -42°$ (c.=1.08 $CHCl_3$); ε240.5=16,900.

EXAMPLE V

18-ethyl-9β,10α-pregn-4-ene-3,20-dione

Adam's catalyst (300 mg.) was hydrogenated in 50 ml. of absolute dioxan. To this suspension 2.9 g. of 3,3′;20,20′-bisethylenedioxy-18-vinyl-9β,10α-pregn-5-ene in 100 ml. of absolute dioxan were added and this solution was shaken in a hydrogen atmosphere. After about 10 minutes when the hydrogen uptake had ceased the catalyst was filtrated off and washed with dioxan. The filtrate was evaporated in vacuo to dryness. Yield 2.9 g. of 3,3′;20,20-bisethylenedioxy - 18-ethyl-9β,10α-pregn-5-ene contaminated with some 3,3′;20,20′-bisethylenedioxy-18-vinyl-9β,10α-pregn-5-ene. The residue was dissolved in 100 ml. of acetone and 4 ml. of 2 n sulfuric acid solution. This solution was refluxed for one hour in a nitrogen atmosphere. After cooling the solution was poured out into 300 ml. of water and extracted with benzene/ether (1:1).

The collected organic layers were washed with water, dried filtrated and the solvent removed under reduced pressure. The crystalline residue (2.1 g.) was recrystallized from acetone/hexane. The physical constants of pure 18-ethyl-9β,10α-pregn-4-ene-3,20-dione are: M.P. 187.5–188.5°; ε242=16,500 (methanol); $[\alpha]_D^{25} = -46°$ ($CHCl_3$) (c.=1.05).

EXAMPLE VI

18-vinyl-9β,10α-pregna-4,6-diene-3,20-dione

With stirring and in a nitrogen atmosphere 1.6 g. of 18-vinyl-9β,10α-pregn-4-ene-3,20-dione were dissolved in 25.5 ml. purified dioxan. To this solution a solution of 1.3 g. (=125%) of dichloro-dicyano-benzoquinone (DDQ) in 14.5 ml. of dioxan/HCl (180 mg. HCl/ml.) was added. The stirring was continued for 7 minutes and then the solution was poured out into 200 ml. of a 1 n sodiumhydroxide solution. After extraction with 200 ml. portions of benzene/ether (1:1) the collected benzene fractions were washed with 200 ml. portions of a 1 n sodium-hydroxide solution (4 times) and then with water (5 times). After drying the solution was filtrated and the solvent removed under reduced pressure. The residue (1.1 g.) was chromatographed on a column of 50 g. silicagel; eluens benzene/ether. Yield 910 mg. of a crystalline compound. After recrystallization from acetone/hexane pure 18-vinyl-9β,10α-pregna-4,6-diene-3,20-dione was obtained. Physical data are: M.P. 168.5–169°; ε286.5=26,200. $[\alpha]_D^{25} = -368°$ (c.=1.01 in $CHCl_3$).

EXAMPLE VII

18-ethyl-9β.10α-pregna-4,6-diene-3,20-dione and 18-ethyl-9β,10α-pregna-4,6-diene-3,20-dione 1.6 g. of 18-ethyl-9β,10α - pregn-4-ene - 3,20-dione were dissolved in 23 ml. purified dioxan. While stirring and in a nitrogen atmosphere a solution of 1.2 g. (125%) of DDQ in 17 ml. of dioxan/HCl (containing 153 mg. HCl/ml.) was added; the stirring was continued for 7 minutes. The solution was then poured out into a solution of 250 ml. 1 n sodium-hydroxide. After extraction with 200 ml. portions of benzene/ether (1:1) the collected benzene fractions were washed with 200 ml. portions (4 times) of a 1 n sodiumhydroxide solution and then with water. After drying the solution was filtrated and the solvent removed under reduced pressure. The residue (1.26 g.) was chromatographed on 60 g. of silicagel; eluens benzene/ether. After chromatography two crystalline fractions were obtained and a mixed fraction of the two before mentioned fractions: fraction A 490 mg. 18-ethyl-9β,10α-pregna - 4,6 - diene-3,20-dione, fraction A–B (210 mg.) and fraction B 320 mg. 18-ethyl-9β,10α,17α-pregna - 4,6 - diene-3,20-dione. Physical constants of the two compounds are: 18-ethyl-9β, 10α-pregna - 4,6 - diene-3,20-dione M.P. 181–181.5°; $[\alpha]_D^{25} = -423°$ (c.=0.97 in $CHCl_3$); ε286.5=26.400 (methanol). 18 - ethyl - 9β,10α,17α - pregna-4,6-diene-3,20-dione. M.P. 159.5–161°; $[\alpha]_D^{25} = -648$; (c.=0.84 in $CHCl_3$); ε286.5=25.300 (methanol).

EXAMPLE VIII

3-hydroxy-18-methyl-9β,10α-pregna-3,5-dien-20-one 3-acetate 1.2 g. of 18 - methyl-9β,10α-pregn-4-ene-3,20-dione (Examples I and II) and 120 mg. of p-toluenesulphonic acid were dissolved in 30 ml. of absolute benzene. After distilling off 2 ml. of benzene 1.5 ml. of distilled isopropenyl acetate were added. Whilst stirring 24 ml. solvent were distilled off slowly under a nitrogen atmosphere. After two hrs. the reaction mixture was cooled to 0° and diluted with 0.2 ml. of pyridine and 50 ml. of ether. After filtration and washing of the precipitate with ether the filtrate was concentrated in vacuo. The residue (1.47 g.) was crystallized from methanol-pyridine (99:1). Physical constants of pure 3 - hydroxy-18-methyl-9β,10α - pregna - 3,5 - dien-20-one 3-acetate are: M.P. 112.5–113°; $[\alpha]_D^{25} = +168°$ (c.=0.90 in $CHCl_3$); ε236=18400.

EXAMPLE IX

6-chloro-18-methyl-9β,10α-pregn-4-ene-3,20-dione 0.5 g. of the 3-enolacetate of 18-methyl-9β,10α-pregn-4-ene-3,20-dione was dissolved in 8 ml. of ether and was cooled to −10° with stirring in a nitrogen atmosphere. To this solution a cooled solution of 1.1 g. of potassium-acetate in 23 ml. of a 85% solution of acetic acid was added. To the cooled solution a solution of 107 mg. of chlorine in 11.6 ml. of acetic acid was added dropwise, whilst stirring was continued for another hour at this temperature (−10°). Then the solution was poured out into 500 ml. of ice-water. The extraction was performed with 100 ml. portions of benzene/ether (1:1). The combined extracts were washed successively with 100 ml. portions of ice-water (3×), 100 ml. portions of a 5% sodiumcarbonate solution (3×) and at last with ice-water. After drying and filtration the solvent was removed under reduced pressure. The residue was chromatographed on a column of 30 g. of silicagel using benzene/petroleum ether and benzene/ether as eluens. Yield 318 mg. of 6-chloro-18-methyl-9β,10α-pregn-4-ene-3,20-dione.

EXAMPLE X 6-chloro-18-methyl-9β,10α-pregna-4,6-diene-3,20-dione 310 mg. of 6-chloro-18-methyl-9β,10α - pregn-4-ene-3,20-dione (Example IX) were dissolved in 6.5 ml. of purified dioxan. To this solution 12 mg. of p-toluenesulphonic acid and 0.3 ml. of ethylorthoformate were added. The reaction mixture was kept in the dark at room temperature for 20 hours. Then 60 ml. of petroleum ether an 0.6 ml. of pyridine were added to the reaction mixture, after which the milky solution was filtered through a column of 6 g. of silicagel. Rechromatography through a column of 6 g. of silicagel yielded 302 mg. of the 3-enolether of 6 - chloro-18-methyl-retroprogesterone. To this compound 1.24 g. of freshly precipitated manganese dioxide, 15 ml. of freshly distilled acetic acid and 1.25 ml. of distilled water were added. The suspension was stirred in a nitrogen atmosphere at room temperature during 1¼ hrs. After filtration and washing of the manganese dioxide with 10 ml. acetic acid the filtrate was poured out into 500 ml. of water. After extraction with 100 ml. portions of benzene-ether (1:1) (3×) the combined organic layers were washed successively with 100 ml. portions of water (3×); 100 ml. portions of a 5% sodiumbicarbonate solution (3×) and at last with water. After drying and filtration the solvent was removed under reduced pressure, yielding 230 mg. of a residue which was chromatographed through a column of 14 g. of silicagel. Yield 120 mg. of 6-chloro-18-methyl-9β,10α-pregna-4,6-diene-3,20-dione which after recrystallisation from ethanol has a M.P. of 166–166.5°; $\epsilon 287.5 = 21.000$.

EXAMPLE XI

6α-chloro-6,7-methylene-18-methyl-9β,10α-pregn-4-ene 3,20-dione

To a solution of 3.2 g. of trimethylsulphoxonium iodide in 64 ml. of dimethylsulphoxide 430 ml. of sodiumhydride (860 mg. of a dispersion in oil (50%) were added. After stirring for 45 minutes at 20° C. a solution of 3.2 g. of 6-chloro-18-methyl-9β,10α-pregna-4,6-diene-3,20-dione (Example X) in 35 ml. of tetrahydrofuran was added. The mixture was stirred for 35 minutes at 20° C. in a nitrogen atmosphere and decomposed by the addition of ethanol and water. The steroid material was extracted with benzene. The benzene extract was washed with water. After drying and evaporation of the solvents, the residue was chromatographed on silicagel to yield 1.2 g. of 6α-chloro-6,7-methylene-18-methyl-9β,10α - pregn-4-ene-3,20-dione; $\epsilon 254.5$ nm.$=10.600$. Melting point 172.5–174.5° C.

EXAMPLE XII 6-chloro-18-methyl-9β,10α-pregna-1,4,6-triene-3,20-dione

To a stirred solution of 1 g. of 6-chloro-18-methyl-9β,10α-pregna-4,6-diene-3,20-dione (Example X) and 880 mg. of DDQ in 25 ml. of absolute dioxan 0.15 ml. of HCl/dioxan (containing 16.5 mg. HCl/ml.) were added. The reaction was carried out in a nitrogen atmosphere during 1½ hours. Then 100 mg. of calcium carbonate was added to the reaction mixture while the stirring was continued for ¼ hr. After filtration the filtrate was refluxed for 1½ hrs. in a nitrogen atmosphere. After distilling off the dioxan in vacuo the residue was taken up in methylenechloride and the solution was then poured out into water. After extraction with 100 ml. portions of methylenechloride (2×) the combined organic layers were successively with 150 ml. portions of water (3×), with 150 ml. portions of a saturated solution of sodium-carbonate (3×) and at last with 150 ml. portions of water (3×). After drying and filtration the solvent was removed in vacuo and the crystalline residue (750 mg.) recrystallized from acetone-n-hexane yielding pure 6-chloro-18-methyl - 9β,10α-pregna-1,4,6-triene-3,20-dione with an M.P. 193–194° and $\epsilon 227=11.800$; $\epsilon 255=10.500$ and $\epsilon 302=10.500$.

EXAMPLE XIII 18-methyl-9β,10α-pregna-1,4,6-triene-3,20-dione 1.12 g. of 18 - methyl-9β,10α-pregna-4,6-diene-3,20-dione and 1.95 g. of 2,3-dicyano-5,6-dichloro-benzoquinone-1,4(D.D.Q) were dissolved in 33 ml. of a dioxan-HCl solution, containing 1 mg. HCl/ml. After stirring 90 min. at room temperature under an atmosphere of nitrogen 85 mg. of calcium carbonate were added and stirring was continued for 30 min. The filtered reaction mixture was refluxed for 90 min. in a nitrogen atmosphere. After removing the solvents the residue was dissolved in methylenechloride and washed with water, a 1 N solution of sodium hydroxide and water and finally dried over sodium sulfate. The solution was filtered and the solvents were evaporated under reduced pressure. The residue was chromatographed on 30 g. of silicagel and crystallized from acetone-petroleum ether (40–60° C.) to give pure 18-methyl - 9β,10α - pregna - 1,4,6 - triene-3,20-dione; M.P. 180–182.5° C.

EXAMPLE XIV 18-methyl-20-hydroxy-9β,10α-pregna-4,6-dien-3-one

To an ice-cooled suspension of 640 mg. of lithiumaluminium-hydride in 30 ml. of dry tetrahydrofuran was added under stirring a solution of 1 g. of 18-methyl-9β,10-pregna-4,6-diene-3,20-dione in 30 ml. of dry tetrahydrofuran. The mixture was in a nitrogen atmosphere stirred for 15 min. and was then refluxed for one hour. The excess of lithiumaluminium-hydride was decomposed by careful addition of ethylacetate and water. The reaction mixture was poured out into water and extracted with methylenechloride. The organic layer was washed with water and dried over sodium sulfate. After evaporation of the solvents the residue was dissolved in 15 ml. of dry dioxan and added to a solution of 1.15 g. of D.D.Q. in 25 ml. of dry dioxan and 25 ml. of dry benzene. After 3 hours at room temperature the reaction mixture was filtered and washed with water, a 1 N solution of sodium hydroxide and water and was finally dried over sodium-sulfate. Chromatography over a column of silicagel and crystallization from acetone-ether gave pure 18-methyl-20-hydrogy-9β,10α-pregna-4,6-dien-3-one, M.P. 186–189° C.; $\epsilon(287.5)=25.800$.

EXAMPLE XV

6α,18-dimethyl-9β,10α-pregn-4-ene-3,20-dione (1) 3-ethoxy - 18 - methyl-9β,10α-pregna-3,5-dien-20-one: To a solution of 2 g. of 18-methyl-9β,10α-pregn-4-ene-3,20-dione in 35 ml. of dry dioxan were added 1.53 ml. of freshly distilled ethyl-orthoformate and 35 mg. of dry p-toluenesulfonic acid. After 24 hrs. at room temperature under an atmosphere of nitrogen no starting material could be detected.

(2) 6β - trichloromethyl - 18 - methyl-9β,10α-pregn-4-ene - 3,20 - dione: To the reaction mixture described in XV (1) were added 1 ml. of dry pyridine and 3.66 g. of freshly distilled trichloro-monobromo-methane. This mixture was in an atmosphere of nitrogen during 7 days exposure to the daylight. After this time the formed complex of pyridine hydrogen bromide-trichloromonobromomethane was filtered off and the filtrate was diluted 340 ml. of a 2 N hydrochloric acid solution. After extraction with methylenechloride (3× 50 ml.) the organic layer was successively washed with water, a 5%-solution of sodium-bicarbonate and water and was finally dried over sodium-sulfate. Evaporation of the solvent under reduced pressure gave a crystalline residue that according to NMR measurements consisted of 6β-trichloromethyl-18-methyl-9β,10α-pregn-4-ene-3,20-dione.

(3) 6-dichloromethylene - 18 - methyl-9β,10α-pregn-4-ene-3,20-dione: A solution of 1.9 g. of 6α-trichloromethyl-18-methyl-9β,10α-pregn - 4 - ene - 3,20-dione in 165 ml. of methanol was added to 100 ml. of a 0.2 N methanolic solution of sodium-methoxide and was refluxed during 2 hrs. in a nitrogen atmosphere. After cooling the reaction mixture was neutralized with acetic acid and the methanol was removed under reduced pressure. The residue was dissolved in 160 ml. of methylenechloride and was then washed with water, a 5%-solution of sodium bicarbonate and water. After drying over sodium-sulfate the solvent was removed under reduced pressure and the residue was purified by chromatography over a column of silicagel and crystallization from methylene-chloride-petroleum ether (1:12). The so obtained pure 6-dichloromethylene-18-methyl-9β,10α-pregn - 4 - ene - 3,20-dione had an M.P. of 235° C.

(4) 6α,18-dimethyl-9β,10α-pregn - 4 - ene - 3,20-dione:
To a hydrated mixture of 3.2 g. of a 2%-palladium on strontium carbonate catalyst in 80 ml. of methylcellulose and 1.9 ml. of triethylamine was added in a nitrogen atmosphere a solution of 2.86 g. of 6-dichloromethylene-18-methyl-9β,10α-pregn-4-ene - 3,20 - dione in 115 ml. of methyl Cellosolve and 35 ml. of toluene. This mixture was shaken with hydrogen till the required quantity (476 ml.) had been taken up. After filtering and evaporation of the solvents, the residue was chromatographed over silicagel and crystallized from acetone to yield 6α,18-dimethyl-9β,10α-pregn-4-ene - 3,20 - dione; M.P. 145–147° C.

EXAMPLE XVI 6,18-dimethyl-9,β,10α-pregna-4,6-diene-3,20-dione

A mixture of 1.7 g. of 6α,18-dimethyl-9β,10α-pregn-4-ene-3,20-dione in 90 ml. of dioxan-HCl (containing 65 mg. HCl/ml.) and 1.47 g. of D.D.Q. in 55 ml. of the same dioxan-HCl solution was stirred for 5 minutes at room temperature in an atmosphere of nitrogen. The reaction mixture was poured out into 2 l. of ice-water. Extraction with 3-portions of 250 ml. of a bezene-ether (1:1) mixture was followed by washing with cold 1 N sodium hydroxide solution and water. After drying the organic phase over sodium sulfate and evaporation of the solvents the compound was purified by chromatography on silicagel and subsequent crystallization from acetone. There was obtained pure 6,18-dimethyl-9β,10α-pregna - 4,6 - diene - 3,20 - dione; M.P. 144° C., ε(290)=19.800.

EXAMPLE XVII

17α-hydroxy-18-methyl-9β,10α-pregna-4,6-diene-3,20-dione 17-acetate

Reduction of 18 - methyl - 9β,10α - pregn - 4 - ene-3,20-dione with LiAlH$_4$ in tetrahydrofuran yielded the corresponding 3,20-diol steroid. The 3-hydroxy group of this compound was selectively oxidized by means of D.D.Q. in benzene at room temperature. The resulting 18-methyl-20 - hydroxy-9β,10α-pregn-4-en-3-one was dehydrated by heating with p-toluene-sulphochloride in pyridine at 50° for about 20 hours, to 18-methyl-9β,10α-pregna-4.17(20)-diene-3-one. The latter compound was oxygenated with N-morpholine-oxide-peroxide in tert.-butanol in the presence of a catalytical amount of osmium-tetraoxide to afford 17α-hydroxy-18-methyl-9β,10α-pregn - 4 - ene - 3,20-dione. Acetylation of this compound with acetic anhydride in acetic acid in the presence of p-toluene-sulphonic acid, at room temperature resulted in the corresponding 17-acetate compound. Dehydrogenation with D.D.Q. in dioxan in the presence of hydrogen chloride finally yielded 17-hydroxy-18-methyl-9β,10α-pregna - 4,6 - diene - 3,20-dione 17-acetate.

EXAMPLE XVIII 6-chloro-17α-hydroxy-18-methyl-9β,10α-pregna-1,4,6-triene-3,20-dione 17-acetate 17 - α - hydroxy - 18 - methyl - 9β,10α - pregn - 4 - ene-3,20-dione as mentioned in Example XVII was treated with acetic anhydride in the presence of p-toluene sulphonic acid to afford 3,17α - dihydroxy - 18 - methyl-9β,10α-pregna-3,5-dien-20-one 3,17-diacetate.

This enolacetate was chlorinated with chlorine in ether-aqueous acetic acid in the presence of potassium-acetate to 6 - chloro - 17α - hydroxy - 18 - methyl - 9β,10α-pregn-4-ene-3,20-dione 17-acetate.

Enol etherification of the 4-en-3-one system was performed by means of ethylorthoformate in dioxan with p-toluenesulphonic acid as a catalyst.

Oxidation of the thus obtained 3-enolether compound with MnO$_2$ in acetic acid afforded 6-chloro-17α-hydroxy-18-methyl-9β,10α-pregna-4,6-diene-3,20-dione 17 acetate. Dehydrogenation of the latter compound with D.D.Q. in dioxan finally resulted in the formation of 6-chloro-17α-hydroxy-18-methyl - 9β,10α - pregna - 1,4,6 -triene-3, 20-dione 17-acetate.

EXAMPLE XIX 2 g. of 18-methyl-9β,10α-pregna-4,6 - diene - 3,20-dione were dissolved in chloroform, which solution was mixed homogeneously with 194 g. of lactose. This mixture was dried at 40° C. during 1 hour. The mixture was wetted with a 10% aqueous solution of 2 g. of gelatine and subsequently ground through a 20 mesh sieve. The mixture was dried at 40° C. during 24 hours, whereupon the granules were ground through a 20 mesh sieve. The mixture was weighed and then had added to it proportional amounts of talcum venetum and magnesium stearate in amounts of optimal 25 g. and 2 g. respectively. The resulting mixture was homogenised and worked to tablets of 225 mg. each.

EXAMPLE XX

Injection liquids of 18-methyl-9β,10α-pregna-4,6-diene-3,20-dione were made as follows: 5.00 g. of the active ingredient were dissolved in 90 ml. of a solution of 2% w./v. benzylalcohol and 46% w./v. benzylbenzoate in ricinic oil at a temperature of 60° C. The solution was cooled to room temperature and replenished to 100 ml. with the ricinic oil solution aforesaid. The mixture was homogenised by stirring and filtrated. Ampoules and vials were filled with the filtrated solution, subsequently sealed and then sterilised by heating for one hour at 120° C.

What is claimed is:
1. A compound selected from the group consisting of compounds of the formulae

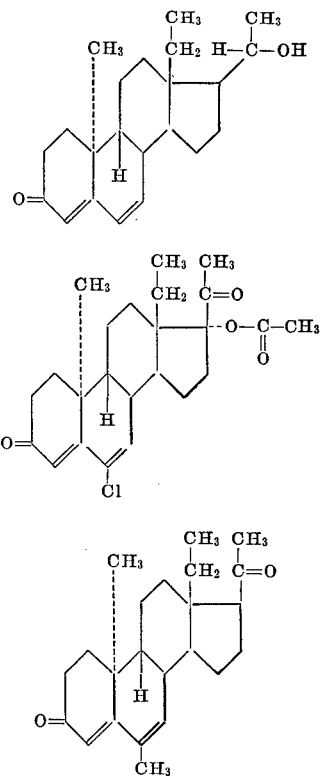

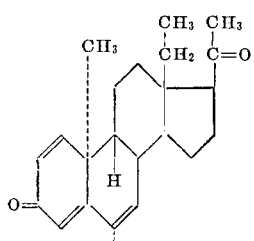
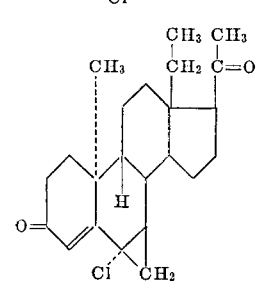
2. A compound of claim 1 of the formula
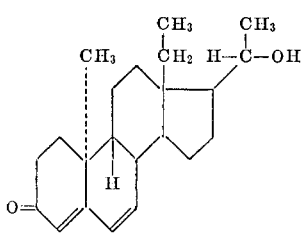
3. A compound of claim 1 of the formula
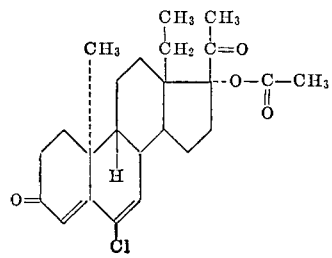
4. A compound of claim 1 of the formula
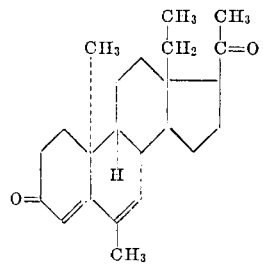
5. A compound of claim 1 of the formula
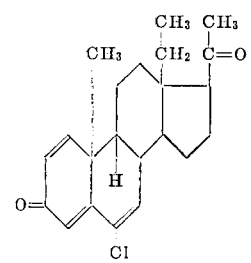
6. A compound of claim 1 of the formula
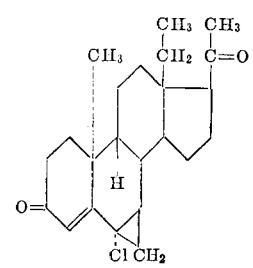
References Cited
UNITED STATES PATENTS
3,373,172  3/1968  Reerink et al. _____ 260—397.45
ELBERT L. ROBERTS, Primary Examiner
U.S. Cl. X.R.
260—239.55, 397.4, 397.5